US007447119B2

(12) United States Patent
Paratte et al.

(10) Patent No.: US 7,447,119 B2
(45) Date of Patent: Nov. 4, 2008

(54) DRIVE MODULE COMPRISING AN MEMS MICROMOTOR, PROCESS FOR THE PRODUCTION OF THIS MODULE AND TIMEPIECE FITTED WITH THIS MODULE

(75) Inventors: Lionel Paratte, Neuchâtel (CH); André Zanetta, Neuchâtel (CH); Pierre-André Meister, Bienne (CH); Yves Petremand, Yverdon-les-Bains (CH); Nicolas Golay, Neuchâtel (CH); Fabien Blondeau, Le Landeron (CH); Wilfried Noell, Neuchâtel (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 11/939,166

(22) Filed: Nov. 13, 2007

(65) Prior Publication Data

US 2008/0111445 A1 May 15, 2008

(30) Foreign Application Priority Data

Nov. 13, 2006 (EP) ................................ 061223973

(51) Int. Cl.
*G04F 5/00* (2006.01)
*G04B 19/02* (2006.01)
*H02N 1/00* (2006.01)
*H02K 5/00* (2006.01)

(52) U.S. Cl. ....................... 368/157; 368/160; 368/220; 310/309; 310/40 MM

(58) Field of Classification Search ................... 368/80, 368/87, 88, 155, 157, 160, 220; 310/40 MM, 310/309
See application file for complete search history.

(56) References Cited

U.S. PATENT DOCUMENTS 5,493,156 A 2/1996 Okada (Continued)

FOREIGN PATENT DOCUMENTS

CH 695 395 4/2006

(Continued)

OTHER PUBLICATIONS

European Search Report issued in corresponding application no. EO 06 12 3973, completed Apr. 4, 2007.

(Continued)

*Primary Examiner*—Vit W Miska
(74) *Attorney, Agent, or Firm*—Griffin & Szipl, P.C.

(57) ABSTRACT

The invention proposes a drive module intended to engage with a clock wheel having a plate made of crystalline or amorphous material comprising a lower layer, which forms a substrate, and an upper layer, into which an MEMS type of micromotor is etched, wherein the micromotor has at least one actuator rotatably driving a rotor, characterized in that a pinion arranged coaxially to the rotor is rotatably connected to the rotor and disposed above the rotor, said pinion being provided to engage with the clock wheel in an engagement zone located close to an outer peripheral edge of the plate, that the rotor is disposed on the plate in order to minimize the distance between the outer peripheral edge of the rotor and the outer peripheral edge of the plate corresponding to the engagement zone, and that the diameter of the pinion is larger than that of the rotor so as to protrude relative to the plate into the engagement zone.

The invention also proposes a process for the production of this module and a timepiece comprising such a module.

12 Claims, 6 Drawing Sheets

U.S. PATENT DOCUMENTS

| | | | | |
|---|---|---|---|---|
| 5,631,514 | A * | 5/1997 | Garcia et al. | 310/309 |
| 5,959,376 | A | 9/1999 | Allen | |
| 6,069,419 | A * | 5/2000 | Tabib-Azar | 310/40 MM |
| 6,137,206 | A * | 10/2000 | Hill | 310/306 |
| 6,211,599 | B1 | 4/2001 | Barnes et al. | |
| 6,313,562 | B1 * | 11/2001 | Barnes et al. | 310/306 |
| 6,402,969 | B1 | 6/2002 | Rodgers et al. | |
| 6,657,360 | B2 * | 12/2003 | Jerman et al. | 310/309 |
| 2004/0119354 | A1 * | 6/2004 | Takada et al. | 310/90 |
| 2004/0156274 | A1 | 8/2004 | Miyazawa et al. | |
| 2005/0100748 | A1 | 5/2005 | Cook et al. | |
| 2007/0069604 | A1 * | 3/2007 | Bourbon et al. | 310/309 |
| 2007/0126300 | A1 * | 6/2007 | Greywall | 310/90.5 |

FOREIGN PATENT DOCUMENTS

| | | | |
|---|---|---|---|
| EP | 0403179 | | 12/1990 |
| FR | 2101203 | | 3/1972 |
| FR | 2874907 | | 3/2006 |
| GB | 2293662 | | 4/1996 |
| WO | 2004 081695 | A2 | 9/2004 |
| WO | 2006 021561 | A1 | 3/2006 |
| WO | 2006 097516 | A1 | 9/2006 |

OTHER PUBLICATIONS

Office Action in related U.S. Appl. No. 11/939,116, dated Aug. 27, 2008.

* cited by examiner

DRIVE MODULE COMPRISING AN MEMS MICROMOTOR, PROCESS FOR THE PRODUCTION OF THIS MODULE AND TIMEPIECE FITTED WITH THIS MODULE

This application claims priority from European Patent Application No. 06123973.7, filed Nov. 13, 2006, the entire disclosure of which is incorporated herein by reference.

FIELD OF THE INVENTION

The present invention relates to a drive module for a clock movement and a timepiece such as a wristwatch fitted with such a drive module.

More specifically, the invention relates to a drive module intended to engage with a clock wheel having a plate made of crystalline or amorphous material comprising a lower layer, which forms a substrate, and an upper layer, into which an MEMS type micromotor is etched, wherein the micromotor has at least one actuator rotatably driving a rotor.

BACKGROUND OF THE INVENTION

Silicon chips are usually rectangular in shape to maximise the number of parts per wafer. This is well suited to the arrangement of functional blocks for the electronics system, since these are likewise rectangular. In the case of an MEMS type micromotor provided in a silicon plate and using comb-type interdigital electrostatic actuators or "comb drive", the actuator(s) generally have a rectangular shape, but as they must generate high forces, they occupy large areas and therefore they cannot be segmented into several blocks to be distributed optimally over a rectangular chip. Since the rotor of the micromotor is circular, it is even more difficult to optimise the occupied surface on the silicon plate supporting the micromotor and on the wafer, which thus results in large unused areas of the silicon. This optimisation can be rendered even more complex if the aim is to maximise the efficiency of the micromotor by optimising the arrangement of the actuator or actuators.

The invention aims to resolve these problems by proposing a drive module that allows optimisation of all these parameters, in particular by optimising the area of silicon necessary for production of the module, while obtaining a micromotor of increased efficiency.

SUMMARY OF THE INVENTION

In this aim, the invention proposes a drive module of the aforementioned type, characterised in that a pinion arranged coaxially to the rotor is rotatably connected to the rotor and disposed above the rotor, said pinion being provided to engage with the clock wheel in an engagement zone located close to an outer peripheral edge of the plate, that the rotor is disposed on the plate in order to minimise the distance between the outer peripheral edge of the rotor and the outer peripheral edge of the plate corresponding to the engagement zone, and that the diameter of the pinion is larger than that of the rotor so as to protrude relative to the plate into the engagement zone.

According to other features of the invention:

the actuator has a stylus, which is movable in a parallel direction to the plane of the plate, which stylus is fitted on its free end with a pawl provided to cooperate with a saw tooth gearing disposed on the outer peripheral edge of the rotor in order to rotatably drive it sequentially, and the angular position of the interlocking zone of the pawl with the rotor is shifted slightly at an angle in relation to the engagement zone;

the stylus extends in a direction that separates the actuator into two fully symmetrical parts;

two actuators are provided, each having a movable stylus, the free end of which is provided with a pawl, one for pushing, the other for pulling, to cooperate with the gearing of the rotor on either side of the engagement zone;

between them the actuators describe an angle in the overall range of between eighty degrees and a hundred and forty degrees, wherein the bisector of this angle passes through the engagement zone and through the axis of rotation of the rotor, so that the plate has a "V" shape in general defined by the outer contour of the plate;

the plate has a central portion, which supports the rotor and two lateral portions, the contour of the plate corresponds overall with the intersection of two rectangles, which are orthogonal to one another and form the two lateral portions, with a transverse rectangle forming the central portion, said transverse rectangle describing an angle of forty five degrees in relation to each of the two other rectangles, the major part of the surface of each lateral portion is occupied by an actuator, whereas the major part of the surface of the central portion is occupied by the rotor, and the engagement zone is disposed close to one of the peripheral edges of the central portion;

the plate has terminals for connection of the actuators to an electronic module, and the terminals are disposed on the central portion on the opposite side to the engagement zone in relation to the axis of the rotor;

the drive module is disposed inside a case having a lower plate provided to be fastened to a timepiece element such as a movement plate and a cover fastened to the lower plate;

the cover has an open indentation in one of its outer peripheral edges, and the pinion is housed in the indentation;

The invention also proposes a process for the production of the drive module, characterised in that it comprises a step of etching several plates in a sheet of crystalline or amorphous material such as a silicon wafer, wherein the plates are interleaved in several columns in the manner of chevrons, the plates of two adjacent columns being oriented in opposite directions.

The invention further proposes a timepiece having a movement rotatably driven by the drive module in accordance with any of above features.

BRIEF DESCRIPTION OF THE DRAWINGS

Other features and advantages of the present invention shall become clearer from reading the following detailed description made with reference to the attached drawings given by way of non-restrictive example, wherein.

DETAILED DESCRIPTION OF THE ILLUSTRATIVE EMBODIMENTS

Figure 1:
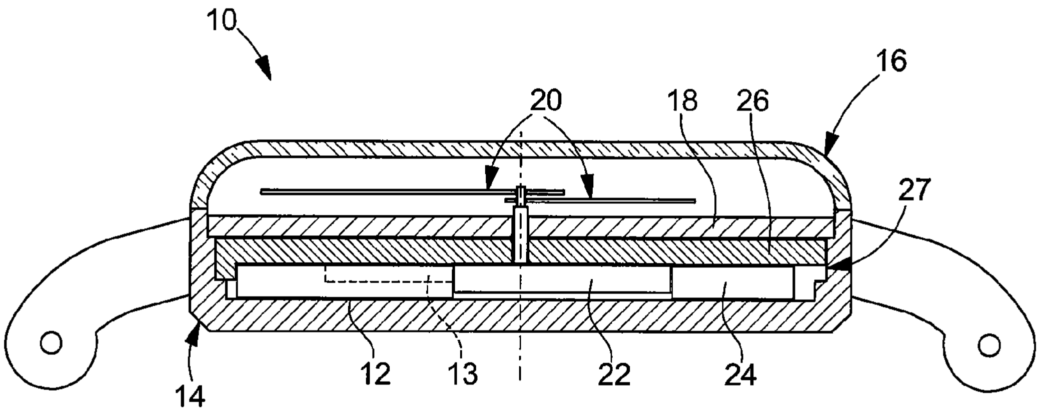
FIG. 1 is a sectional view schematically showing a timepiece configured in accordance with the teaching of the invention.

FIG. 1 schematically represents a timepiece 10 in the form of a wristwatch fitted with a drive module 13 in accordance with the teaching of the invention, wherein here the drive module 13 is disposed inside a case 12.

The timepiece 10 comprises a watch case 14 closed by a glass 16, a dial 18 and analog display means in the form of hands 20 in this case. The hands 20 are provided to be rotatably driven by the drive module 13 according to the invention by means of a movement 22 comprising scaler elements, for example. The drive module 13 is supplied with electric power by a battery 24. The case 12, the drive module 13, the movement 22 and the battery 24 in this case are mounted on a plate 26 and together form the movement mechanism 27 of the timepiece 10, this movement mechanism 27 being fastened to the inside of the watch case 14. The movement mechanism 27 clearly comprises other elements (not shown), in particular an electronic module having an integrated circuit, a time base having a quartz crystal, a printed circuit board etc.

Figure 2:
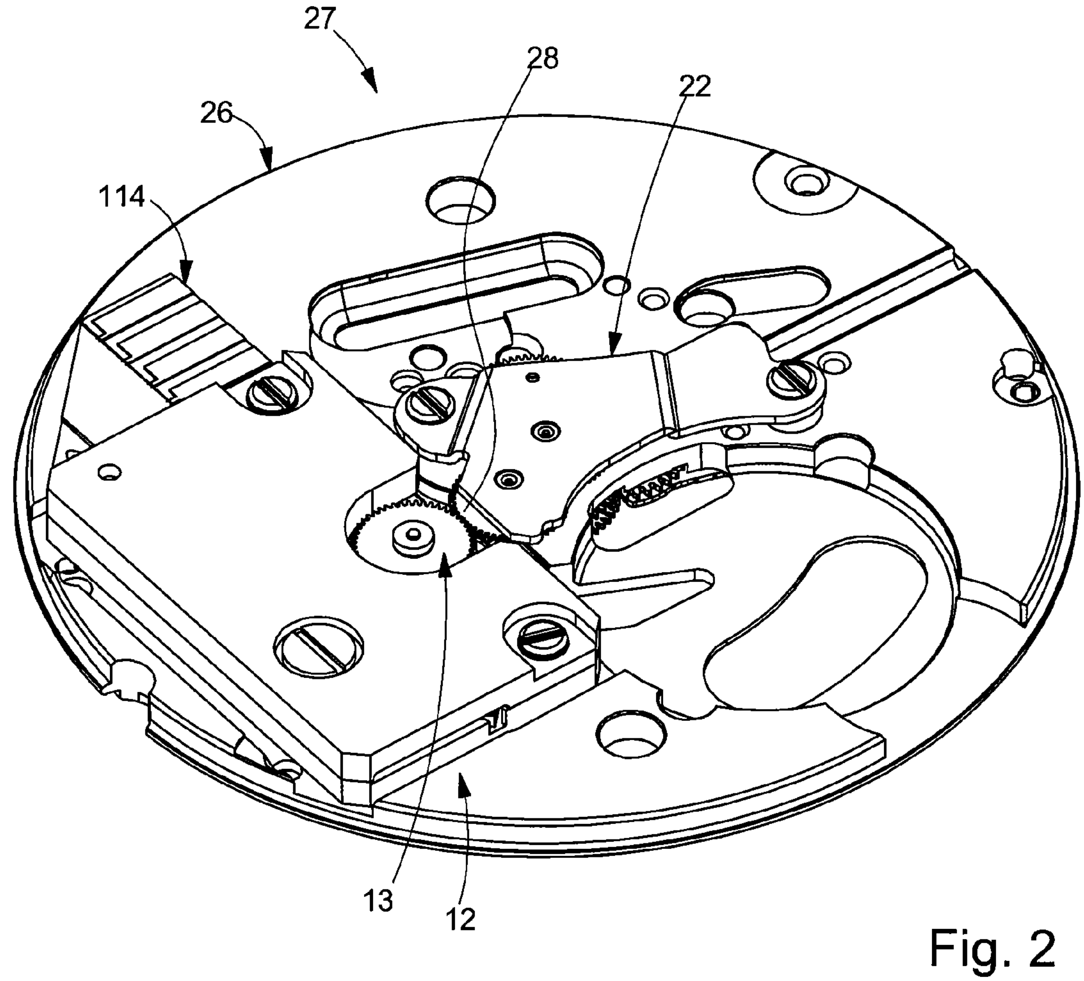
FIG. 2 is a perspective view partially showing the movement of the timepiece of FIG. 1 fitted with a drive module having an MEMS type micromotor.

FIG. 2 shows a section of the movement mechanism 27 of the timepiece 10, in particular the plate 26 on which the case 12 and the movement 22 are mounted.

The drive module 13 is intended to engage with a clock wheel, i.e. the input wheel 28 of the movement 22.

The different elements of the drive module 13 according to the invention are shown in more detail in FIGS. 3 to 7.

The drive module 13 has a plate 30 made of crystalline or amorphous material, e.g. silicon, having a lower layer forming a substrate 32 and an upper layer 34, into which an MEMS (Micro ElectroMechanical System) type micromotor 36 is etched. The micromotor 36 in this case is formed by two actuators 38, 40 that rotatably drive a rotor 42 etched into the upper layer 34.

Each actuator 38, 40 has a stylus 44, 46 movable in a direction A1, A2 parallel to the plane of the plate 30. Each stylus 44, 46 is fitted on its free end with a pawl 48, 50 provided to cooperate with a saw tooth gearing 52 disposed on the outer peripheral edge of the rotor 42 for the purpose of rotatably driving it sequentially.

Each stylus 44, 46 preferably extends in a direction A1, A2 which separates the associated actuator 38, 40 into two completely symmetrical parts. A first actuator 38 preferably comprises a push pawl 48 and a second actuator 40 preferably comprises a pull pawl 50.

In this case, each actuator 38, 40 is a comb-type interdigital electrostatic actuator and is formed by etching into the silicon plate 30. Here, the plate 30 is a silicon on insulator (SOI) type plate and has a thick lower silicon substrate layer 32, a silicon oxide intermediate layer 54 and a silicon upper layer 34 with a lower thickness than the substrate 32.

The fixed part of each actuator 38, 40 has a supply terminal 56, 58 for electrical connection to the electronic module, and the movable part of each actuator 38, 40 has a contact terminal 57, 59 which applies a determined potential to these movable parts, zero volts in this case.

A micromotor having electrostatic actuators configured in a silicon plate is described and shown in patent document WO 2004/081695 and its U.S. equivalent U.S. Patent Application Publication No. US 2007/0069604 A1, for example, which are incorporated herein by reference. In these documents, the motor is formed in a silicon layer by etching. It has a toothed drive wheel and drive pins that cooperate with the teeth of the wheel to cause it to rotate. Each drive pin is displaceably joined to a movable comb that is displaced in relation to a fixed comb dependent on a voltage applied to the fixed comb.

An embodiment using an SOI plate is described with reference to FIGS. 7A to 7D in the aforementioned document.

According to an advantageous embodiment, each actuator 38, 40 is connected to a passive pawl 49, 51, the locking zone of which is located between the engagement zone 70 and the locking zone of the associated pawl. These passive pawls 49, 51 are held in elastic engagement with the rotor 42 in order to assure a precise angular positioning, in particular during the driving phases when the other pawls 48, 50 are displaced.

According to the embodiment shown in FIGS. 3 to 7, the rotor 42 is guided by a central integrated or guided slide bearing 60 formed at the same time as the pawls 48, 50 and having a bearing clearance amounting to between 4 and 10 microns, the approximate lower limit corresponding to a thick silicon layer of 80 microns. The pawls 48, 50 will work well if they act on a tangential course that is significantly larger than this clearance, i.e. typically between 20 and 100 microns. This corresponds favourably to the range of possible courses with styli 44, 46 guided by deflection springs (not shown).

The torque of the rotor 42 is transmitted to a pinion 62 by a system similar to a crank. The pinion 62 located just above the rotor 42 is coaxial hereto and is guided by a central shaft 64. The pinion 62 is provided with pins 66 fitted into slots 68 of the rotor 42. Operating clearances j_group, j_rot, j_pi are provided between various elements of the rotor 42 and the pinion 62, as shown in the diagram in FIG. 7. Thus, the rotor 42 and pinion 62 are coupled at an angle but are independent laterally: the clearances in plane xy are taken up by the bearing 60 for the rotor 42 and by the shaft 64 for the pinion 62. Thus, the lateral reaction force resulting from the load is not taken up by the bearing 60 at the rotor 42, but by the guidance of the pinion 62 by the shaft 64. Thus, the microfabricated elements of the micromotor 36 are protected from higher forces applied by the watch elements in the case of impacts, for example.

The pinion 62 is provided to engage with the input wheel 28 of the movement 22 in an engagement zone 70 located close to an outer peripheral edge 72 of the plate 30.

According to an advantageous feature, the rotor 42 is disposed on the plate 30 so as to minimise the distance D between the gearing 52 of the rotor 42 and the outer peripheral edge 72 of the plate 30 corresponding to the engagement zone 70. Moreover, the outside diameter of the pinion 62 is slightly larger than that of the rotor 42 so that it protrudes in relation to the plate 30 into the engagement zone 70.

Figure 7:
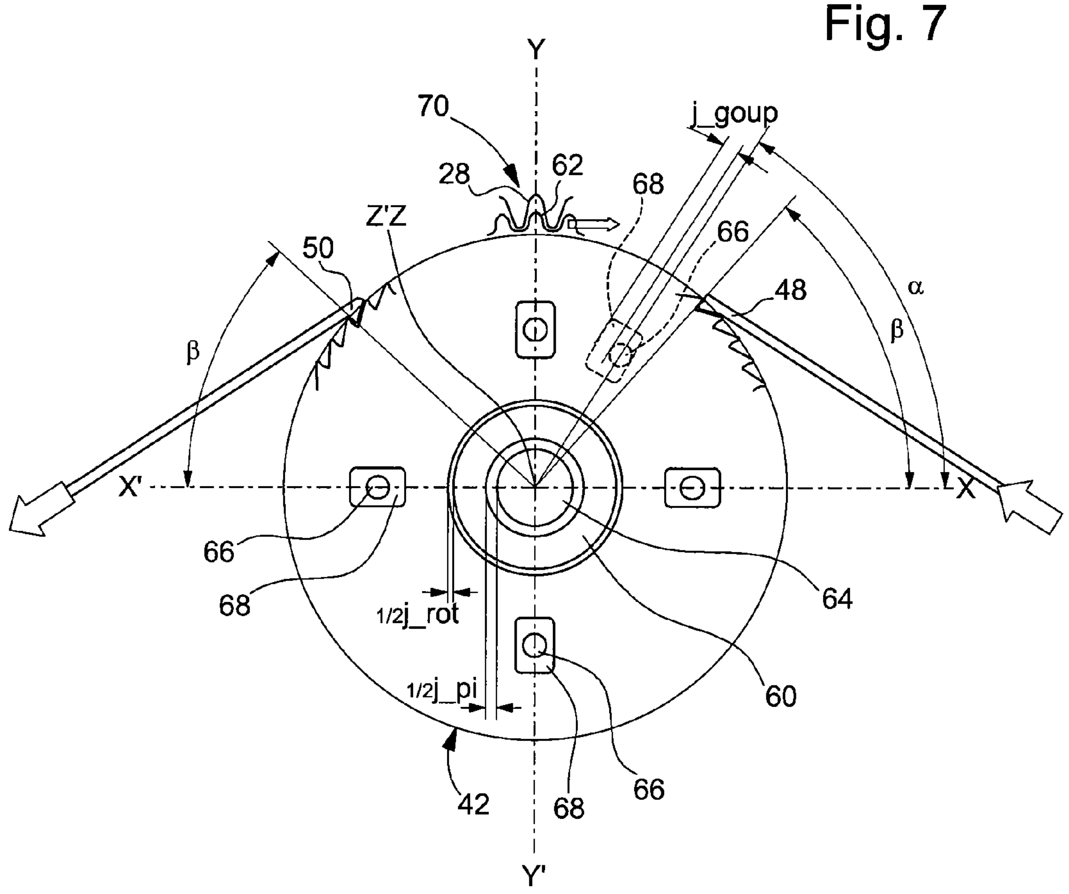
FIG. 7 is a schematic plan view that illustrates the actuation of the pinion by the rotor by means of pins.

To simplify the diagram in FIG. 7, a rotor 42 having only four slots 68 and a pinion 62 having only four pins 66 are shown. According to an advantageous embodiment, as illustrated in particular in FIGS. 3 and 4, eight slots 68 and eight pins 66 are provided.

According to a preferred embodiment, the angular position of the interlocking zone of each pawl 48, 50 with the rotor 42 is shifted at an angle in relation to the engagement zone 70. The locking zone of each pawl 48, 50 forms an angle β with axis x'x. α represents the angle, at a given instant, between the radius passing through the pin 66, which when engaged abuts against the edge of its slot 68, and axis x'x (FIG. 7).

Then, an appropriate choice of all the parameters {α, β, j_rot, j_pi, j_group} for the given radii of the pinion 62, rotor 42 and the circle of pins 66 will benefit the efficiency of the transmission of mechanical power from the rotor 42 to the pinion 62. Thus, in a particular case of the invention wherein β=45°, if the clearances are properly adjusted, the efficiency for a system of four pins is close to 85%, which improves the efficiency compared to a case where the rotor 42 and the pinion 62 are stuck to one another. In fact, in this latter case all the load would be found in the form of silicon-silicon friction laterally at the bearing 60 and vertically between the periphery of the rotor 42 and the substrate 32 because of the tilting torque. Now, silicon-silicon friction is rather unfavourable with static dry coefficients approaching 0.4.

This transmission solution further allows the diameter of the pinion 62 to be varied in order to adapt the torques and speeds according to the loads. Moreover, if the pinion 62 is sufficiently large and projects beyond the peripheral edge 72 of the plate 30, the engagement by the sheet will be simplified and the drive module 13 can be assembled on the plate 26 of the timepiece 10 in modular fashion, i.e. without detaching/reattaching the driven wheel 28.

According to different variants:

- the rotor 42 is microfabricated in situ and on the same substrate 32 as the actuators 38, 40 to guarantee pairing with the bearing 60 and pawls;
- another variant consists of fabricating a rotor 42 separately on the same wafer or on another wafer, and this rotor 42 is then assembled on the plate 30 or stator. This allows the radial clearance to be reduced, if desired, in the case where the rotor is guided by the bearing 60;
- a group of related variants constitutes rotors 42 and/or pinions 62 microfabricated by processes other than DRIE machining (laser cutting, EDM, LIGA, microinjection etc.), then assembled on the plate 30 at? the stator;
- another group of related variants constitutes pins 66 formed by a second photolithographic level in the pinion 62 and/or in the rotor 42.

The drive module 13 according to the invention allows increased modularity for adaptation to the load by allowing the use of pinions 62 of different diameters without modifying the rest of the module 13. In this way, an increased modularity is also obtained for the assembly, as the mechanical interface for connection to the watch movement 22 already exists because of the presence of the pinion 62 integrated into the drive module 13 and rotatably connected to the micromotor 36.

The pinion 62 can be made of metal such as brass with associated pins 66 also formed of metal. The pinion 62 can also be made of plastic material in one piece with the pins 66 by moulding. An embodiment of the pinion 62 made of plastic material with moulded-on metal pins 66 is also possible.

Figure 4:
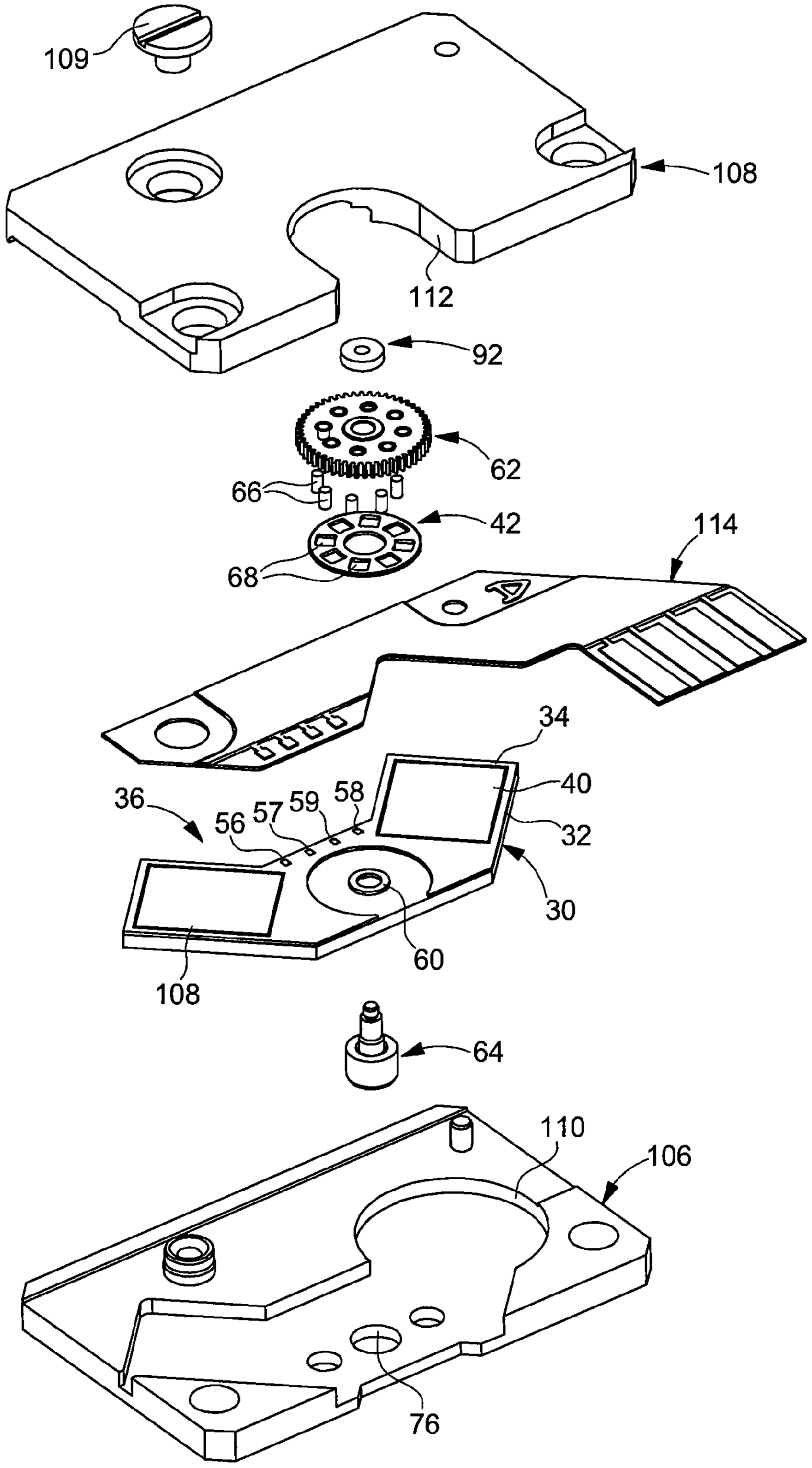
FIG. 4 is an exploded perspective view showing the drive module of FIG. 2 and the case enclosing this drive module.
Figure 5:
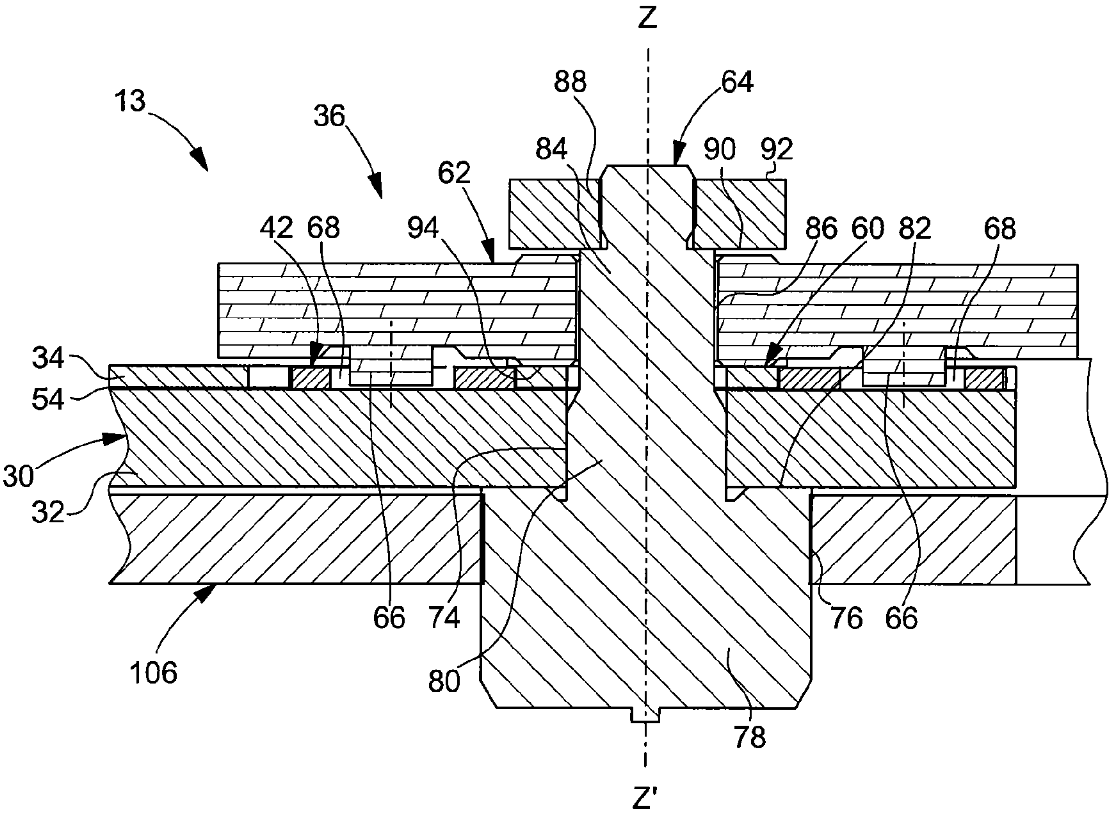
FIG. 5 is an enlarged view in axial section taken along line 5-5 that schematically shows a portion of the drive module and illustrates the rotatable mounting of a pinion and a rotor of the micromotor around a shaft.
Figure 6:
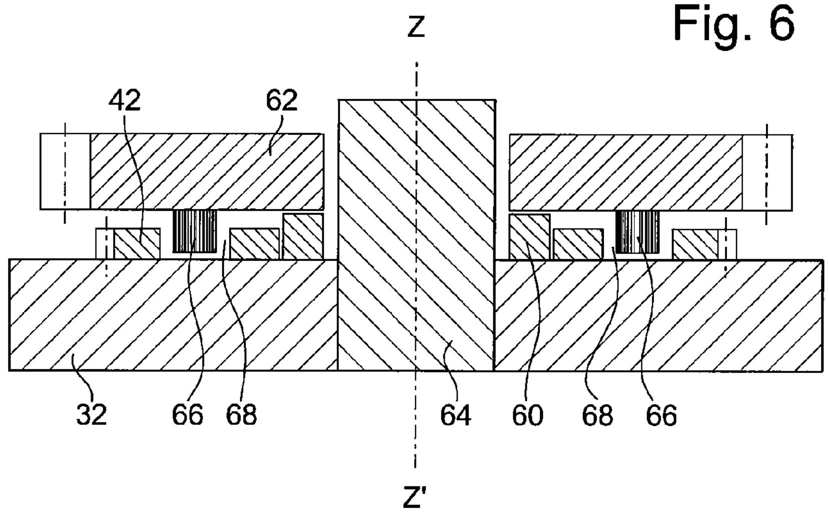
FIG. 6 is a schematic view in axial section taken along line X'X that illustrates the actuation of the pinion by the rotor by means of pins.

According to the embodiment shown in particular in FIGS. 4 and 5, the axis of rotation of the pinion 62 is formed by a stepped shaft 64 made of cut out metal, which is inserted into the plate 30 through a first hole 74 formed in the substrate 32 and which is driven into a second hole 76 formed in a plate 106 of the case 12. In this embodiment, the radial forces applied to the shaft 64 are absorbed by the plate 106.

The shaft 64 has a lower end piece 78 which with a lower intermediate piece 80 defines a first shoulder surface 82 oriented upwards and axially abutting against the lower face of the plate 30. The lower intermediate piece 80 has a diameter that is essentially equal to the diameter of the first hole 74 and extends into this hole 74. The shaft has an upper intermediate piece 84 with a diameter that is slightly less than the adjacent lower intermediate piece 80 and extends into the bore 86 of the pinion 62 to rotatably guide it. The upper intermediate piece 84 together with the upper end piece 88 defines a second shoulder surface 90, against which a retaining ring 92 driven in on the upper end piece 88 is held in axial abutment.

Since the rotatable guidance of the rotor 42 is provided by the bearing 60, which is formed by a photolithographic etching process in the same way as the first hole 74 that determines the centring of the shaft 64 in relation to the bearing 60, a very favourable centring of the shaft 64, the pinion 62, the bearing 60 and the rotor 42 is obtained.

In addition, the lower face of the pinion 62 facing the bearing 60 has a bulge 94 which prevents the pinion 62 from coming into axial abutment against the rotor 42, in particular in the case of tilting, and this prevents deterioration of the rotor 42.

Figure 8:
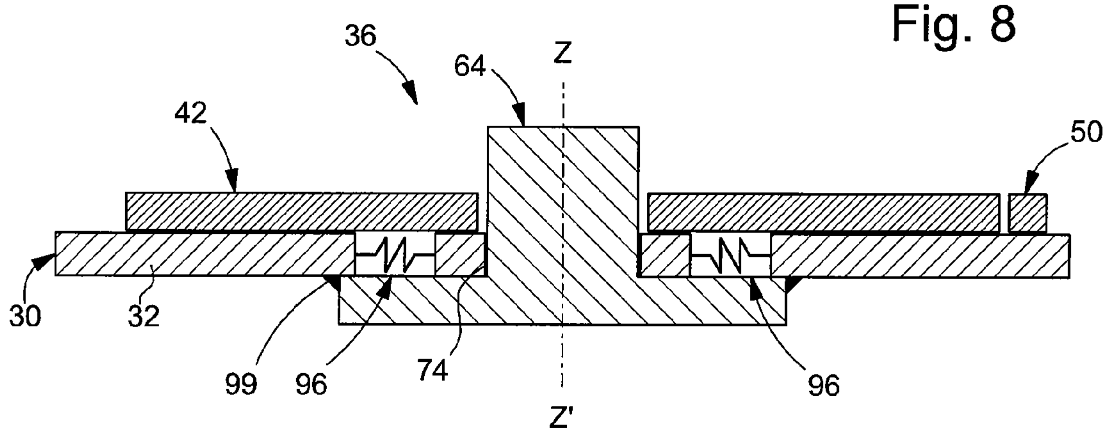
FIG. 8 is a schematic view in axial section taken along line X'X which illustrates a variant of the assembly of the shaft in relation to the rotor.
Figure 9:
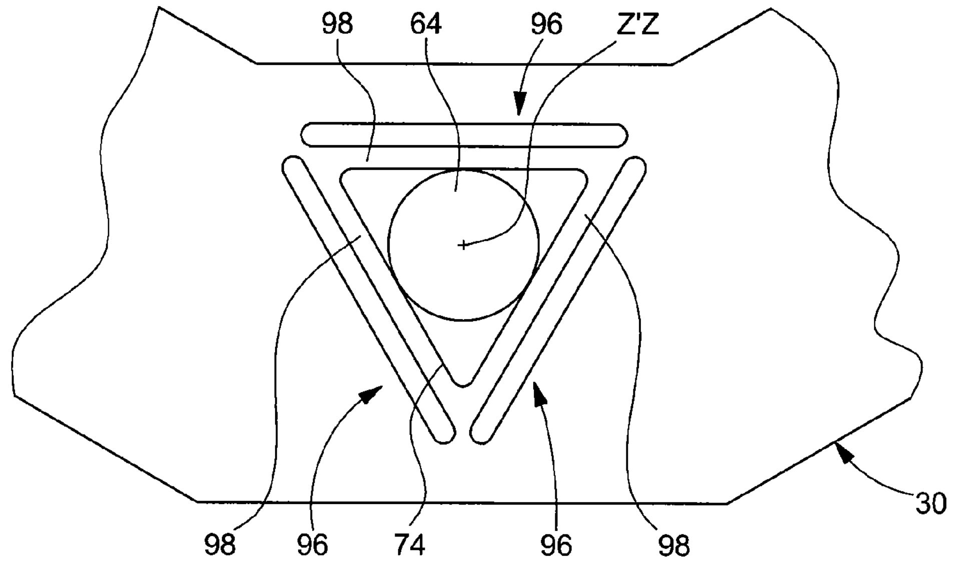
FIG. 9 is a plan that schematically represents the elastic fastening structures disposed in the plate for clamping and centring the shaft according to the assembly arrangement of FIG. 8.

FIGS. 8 and 9 show another advantageous embodiment, in which the shaft 64 is mounted in the plate 30 in the manner of a driven-in arrangement by means of elastic fastening structures 96 disposed in the substrate 32 around the first hole 74. In this embodiment, the radial forces applied to the shaft 64 are absorbed by the substrate 32 and therefore by the elastic fastening structures 96.

The elastic fastening structures 96 are formed here by flexible lugs 98 lithographed into the rear face of the plate 30. Since the lithography of the front face for the upper layer 34 comprising the pawls 48, 50 and the rotor 42 is likewise aligned and centred very precisely in relation to the lithography of the rear face (error less than 1 micron), a guidance and centring results that is more precise than with an axis formed from a single piece with the plate 30, since the radial clearance can also be reduced to one micron.

Because of this precise alignment and centring, it is possible to omit the bearing 60 such that the rotor 42 is then directly rotatably guided by the shaft 64. Thus, the shaft 64 can rotatably guide both the rotor 42 and the pinion 62. Since the shaft 64 is formed by cutting, which enables very restricted production tolerances to be reached, a very precise assembly is achieved, which in particular assures a reliable operation of the actuators 38, 40. The rotor 42 is then guided by the outer axial wall of the shaft 64.

The shaft 64 can finally be fixed in the plate 30 by an additional fastening method, e.g. by welding to the substrate 32 by means of a weld 99 shown in FIG. 8 or also by gluing.

The problems of friction against the shaft 64 can be resolved by applying a solid thin layer onto the outer axial wall of the shaft 64 enabling the friction between the parts to be reduced.

The elastic fastening structures 96 can be selected in particular from the examples described and shown in patent document CH 695 395 or from other structures that can ensure precise centring and clamping of the shaft 64 on the plate 30, e.g. structures in the form of flexible tabs with free ends.

Figure 3:
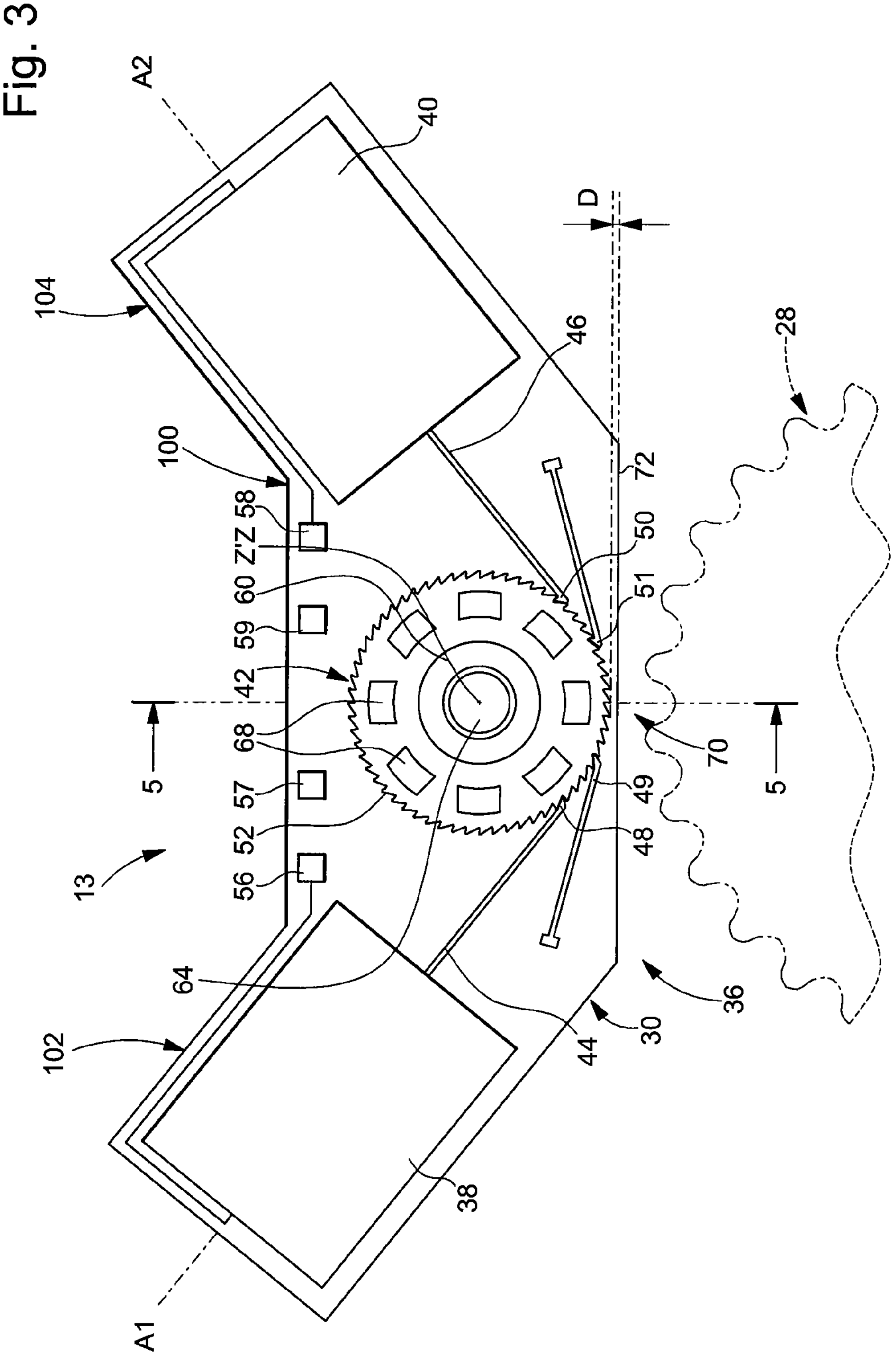
FIG. 3 is a plan view that schematically shows the drive module of FIG. 2.

Advantageously, considering FIG. 3 in particular, the actuators 38, 40 between them describe an angle of about ninety degrees, the bisector of this angle passing through the engagement zone 70 and through the axis of rotation z'z of the rotor 42 such that the drive module 13 has a general "V" shape defined by the outer contour of the plate 30, this contour being optimised.

The plate 30 has a central portion 100, which supports the rotor 42 and two lateral portions 102, 104. The outer contour of the plate 30 corresponds overall to the intersection of two rectangles, which are orthogonal to one another and form the two lateral portions 102, 104, with a transverse rectangle forming the central portion 100, the transverse rectangle describing an angle of forty five degrees in relation to each of the two other rectangles. The major part of the surface of each lateral portion 102, 104 is occupied by an actuator 38, 40, whereas the major part of the surface of the central portion 100 is occupied by the rotor 42. The engagement zone 70 is disposed close to one of the peripheral edges 72 of the central portion 100.

The terminals 56, 57, 58, 59 are preferably disposed on the central portion 100 on the side opposite the engagement zone 70 in relation to the axis z'z of the rotor 42.

Figure 10:
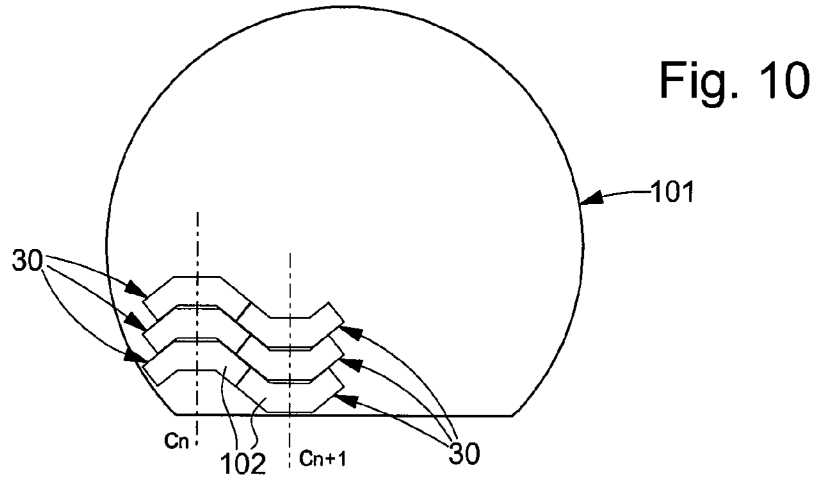
FIG. 10 is a plan view that schematically represents a silicon wafer and illustrates an example of assembly of several micromotors on the wafer.

It should be noted that the "V" shape of the drive module 13 has the advantage of enabling the efficiency of the micromotor 36 to be optimised in relation to the surface of the plate 30 used, and the surface of the crystalline or amorphous material used to form the micromotors 36 and the drive modules 13 to be optimised. Thus, when the plate 30 is made from a silicon wafer 101, as shown schematically in FIG. 10, the "V" shape allows replication of the interleaved arrangement of the plates 30 on the surface of the wafer to maximise the number of micromotors 36 obtained from a given surface of silicon. In particular, according to the example shown in FIG. 10, the plates 30 can be arranged on the wafer in parallel columns in the manner of chevrons, two adjacent columns Cn, Cn+1 being oriented in opposite directions. Moreover, the lateral portions 102 of two adjacent plates 30 of two adjacent columns Cn, Cn+1 are adjacent and in alignment.

The angle described by the two actuators 38, 40 is preferably in the range of between ninety and a hundred and forty degrees. The greater the angle, the more the interleaving of the plates 30 on the wafer 101 is optimised, but the significant angles require that the styli 44, 46 of the actuators 38, 40 are out of line in relation to their respective axes of symmetry A1, A2, which is detrimental to the mechanical efficiency of the actuators 38, 40.

According to the embodiment shown in the figures, the case 12 containing the drive module 13 has a lower plate 106 provided to be fastened to an element of the timepiece 10, here to the plate 26 of the movement, and the plate 30 of the drive module 13 is mounted on the lower plate 106. The case 12 has a protective cover 108, which covers the drive module 13 that is fastened to the lower plate 106, in this case by means of a screw 109, and which holds the drive module 13 against the lower plate 106.

The upper face of the lower plate 106 in this case has a recess or receptacle 110, in which the plate 30 of the drive module 13 is received in an essentially complementary manner.

The cover 108 has an open indentation 112 in one of its outer peripheral edges, and the pinion 62 is housed in the indentation 112 after the cover 108 is mounted on the lower plate 106.

Advantageously, a printed circuit 114 is interposed between the lower plate 106 and the cover 108 to enable the micromotor 36 to be electrically connected via its terminals 56, 57, 58, 59 to the electronic module of the timepiece 10.

According to a exemplary embodiment (not shown), the drive module 13 can be mounted directly on the plate 26, which allows the case 12 to be dispensed with, in particular to minimise the number of components to facilitate assembly of the movement mechanism 27 and to minimise the space requirement of the drive means. A protective element can be provided on the drive module 13 to protect its components.

The invention claimed is:

1. A drive module intended to engage with the clock wheel having a plate made of crystalline or amorphous material comprising a lower layer, which forms a substrate, and an upper layer, into which an MEMS type of micromotor is etched, wherein the micromotor has at least one actuator rotatably driving a rotor, wherein a pinion arranged coaxially to the rotor is rotatably connected to the rotor and disposed above the rotor, said pinion being provided to engage with the clock wheel in an engagement zone located close to an outer peripheral edge of the plate, that the rotor is disposed on the plate in order to minimize the distance between the outer peripheral edge of the rotor and the outer peripheral edge of the plate corresponding to the engagement zone, and that the diameter of the pinion is larger than that of the rotor so as to protrude relative to the plate into the engagement zone.

2. The drive module according claim 1, wherein the actuator has a stylus, which is movable in a parallel direction to the plane of the plate, which stylus is fitted on its free end with a pawl provided to cooperate with a saw tooth gearing disposed on the outer peripheral edge of the rotor in order to rotatably drive it sequentially, and that the angular position of the interlocking zone of the pawl with the rotor is shifted slightly at an angle in relation to the engagement zone.

3. The drive module according to claim 2, wherein the stylus extends in a direction that separates the actuator into two fully symmetrical parts.

4. The drive module according to claim 3, wherein two actuators are provided, each having a movable stylus, the free end of which is provided with a pawl, one for pushing, the other for pulling, to cooperate with the gearing of the rotor on either side of the engagement zone.

5. The drive module according to claim 2, wherein two actuators are provided, each having a movable stylus, the free end of which is provided with a pawl, one for pushing, the other for pulling, to cooperate with the gearing of the rotor on either side of the engagement zone.

6. The drive module according to claim 5, wherein between them the actuators describe an angle in the overall range of between eighty degrees and a hundred and forty degrees, wherein the bisector of this angle passes through the engagement zone and through the axis of rotation of the rotor, so that the plate has a "V" shape in general defined by the outer contour of the plate.

7. The drive module according to claim 6, wherein the plate has a central portion, which supports the rotor and two lateral portions, that the contour of the plate corresponds overall with the intersection of two rectangles, which are orthogonal to one another and form the two lateral portions, with a transverse rectangle forming the central portion, said transverse rectangle describing an angle of forty five degrees in relation to each of the two other rectangles, that the major part of the surface of each lateral portion is occupied by an actuator, whereas the major part of the surface of the central portion is occupied by the rotor, and that the engagement zone is disposed close to one of the peripheral edges of the central portion.

8. The drive module according to claim 7, wherein the plate has terminals for connection of the actuators to an electronic module, and that the terminals are disposed on the central portion on the opposite side to the engagement zone in relation to the axis of the rotor.

9. The drive module according to claim 1, wherein it is disposed inside a case having a lower plate provided to be fastened to a timepiece element such as a movement plate and a cover fastened to the lower plate.

10. The drive module according to claim 9, wherein the cover has an open indentation in one of its outer peripheral edges, and that the pinion is housed in the indentation.

11. A process for the production of a drive module according to claim 6, wherein it comprises a step of etching several plates in a sheet of crystalline or amorphous material such as a silicon wafer, wherein the plates are interleaved in several columns in the manner of chevrons, the plates of two adjacent columns being oriented in opposite directions.

12. A timepiece having a movement rotatably driven by a drive module intended to engage with a clock wheel having a plate made of crystalline or amorphous material comprising a lower layer, which forms a substrate, and an upper layer, into which an MEMS type of micromotor is etched, wherein the micromotor has at least one actuator rotatably driving a rotor, wherein a pinion arranged coaxially to the rotor is rotatably connected to the rotor and disposed above the rotor, said pinion being provided to engage with the clock wheel in an engagement zone located close to an outer peripheral edge of the plate, that the rotor is disposed on the plate in order to minimize the distance between the outer peripheral edge of the rotor and the outer peripheral edge of the plate corresponding to the engagement zone, and that the diameter of the pinion is larger than that of the rotor so as to protrude relative to the plate into the engagement zone.

* * * * *

UNITED STATES PATENT AND TRADEMARK OFFICE

CERTIFICATE OF CORRECTION

PATENT NO. : 7,447,119 B2
APPLICATION NO. : 11/939166
DATED : November 4, 2008
INVENTOR(S) : Lionel Paratte et al.

It is certified that error appears in the above-identified patent and that said Letters Patent is hereby corrected as shown below:

On the Title page Item (30) should read:

(30) Foreign Application Priority Data

Nov. 13, 2006 (EP) ...................................... 06123973

Signed and Sealed this

Twenty-first Day of April, 2009

JOHN DOLL
*Acting Director of the United States Patent and Trademark Office*